(12) United States Patent
Calhoun et al.

(10) Patent No.: US 9,027,908 B1
(45) Date of Patent: May 12, 2015

(54) FIELD-INSTALLABLE PULLING EYE

(75) Inventors: Franklin Calhoun, Carrollton, GA (US); Allan Wayne Daniel, Woodland, AL (US)

(73) Assignee: Southwire Company, LLC, Carrollton, GA (US)

( * ) Notice: Subject to any disclaimer, the term of this patent is extended or adjusted under 35 U.S.C. 154(b) by 867 days.

(21) Appl. No.: 13/223,889

(22) Filed: Sep. 1, 2011

(51) Int. Cl.
| | | |
|---|---|---|
| H02G 1/08 | (2006.01) | |
| B63B 35/03 | (2006.01) | |
| B65H 59/00 | (2006.01) | |
| F16G 11/02 | (2006.01) | |

(52) U.S. Cl.
CPC ............... *F16G 11/02* (2013.01); *H02G 1/081* (2013.01)
USPC .......... 254/134.3 R; 254/134.3 FT; 254/134.4

(58) Field of Classification Search
CPC ............. F16D 1/00; F16G 11/00; H02G 1/00; B66C 1/00
USPC .................... 254/134.3 R, 134.3 FT, 134.4
See application file for complete search history.

(56) References Cited

U.S. PATENT DOCUMENTS

| | | |
|---|---|---|
| 524,035 A | 8/1894 | White |
| 633,067 A | 9/1899 | Brien |
| 2,007,411 A | 7/1935 | Karel |
| 2,007,441 A | 7/1935 | Candy, Jr. |
| 2,231,919 A | 2/1941 | Kent |
| 2,339,671 A | 1/1944 | Bergman |
| 2,498,834 A | 2/1950 | Bennett et al. |
| 2,615,074 A | 10/1952 | Bronovichi |
| 3,166,810 A | 1/1965 | Ensley |
| 3,330,533 A | 7/1967 | Blume |
| 3,573,346 A | 4/1971 | Appleby |
| 3,727,967 A | 4/1973 | Anastasiu et al. |
| 3,989,400 A | 11/1976 | Smith et al. |
| 4,002,817 A | 1/1977 | DeGrado |
| 4,101,114 A * | 7/1978 | Martin et al. ......... 254/134.3 FT |
| 4,183,692 A * | 1/1980 | Durr .............................. 403/275 |
| 4,199,653 A | 4/1980 | Talley |

(Continued)

FOREIGN PATENT DOCUMENTS

| | | |
|---|---|---|
| JP | 01110013 A | 4/1989 |
| JP | 11134069 | 5/1999 |

(Continued)

OTHER PUBLICATIONS

International Search Report and Written Opinion dated May 12, 2010 in PCT/US10/02811.

(Continued)

*Primary Examiner* — Lee D Wilson
*Assistant Examiner* — Seahee Yoon
(74) *Attorney, Agent, or Firm* — Hartman & Citrin LLC

(57) ABSTRACT

A field-installable pulling eye and a method for providing and using the same are disclosed. The pulling eye comprises a bolt, a sleeve, and a collet. The sleeve has a hollow interior defining a cavity configured to receive the collet through an open end, and an aperture passing from the exterior of the sleeve to the cavity at the opposite end. The bolt has a head portion and a threaded shaft configured to pass through the aperture and engage a complementary threaded orifice at one end of the collet. The collet has two or more jaws extending from the opposite end that are configured to exert a compression force the terminal end of a conductor inserted between the jaws as the collet is drawn into the cavity of the sleeve by tightening the bolt.

21 Claims, 8 Drawing Sheets

(56) References Cited

U.S. PATENT DOCUMENTS

| | | | |
|---|---|---|---|
| 4,337,923 | A | 7/1982 | Smith |
| 4,411,409 | A | 10/1983 | Smith |
| 4,419,534 | A | 12/1983 | Dwyer |
| 4,432,663 | A * | 2/1984 | Lasak et al. ........... 254/134.3 FT |
| 4,460,159 | A | 7/1984 | Charlebois et al. |
| 4,565,351 | A | 1/1986 | Conti et al. |
| 4,596,486 | A | 6/1986 | Niederer, Sr. |
| 4,609,180 | A | 9/1986 | Fisher et al. |
| 4,627,187 | A | 12/1986 | Williams |
| 4,635,989 | A | 1/1987 | Tremblay et al. |
| 4,655,432 | A | 4/1987 | Woodruff |
| 4,684,161 | A | 8/1987 | Egner et al. |
| 4,691,988 | A | 9/1987 | Tremblay et al. |
| 5,013,125 | A | 5/1991 | Nilsson et al. |
| 5,039,169 | A | 8/1991 | Bougher et al. |
| 5,039,196 | A | 8/1991 | Nilsson |
| 5,067,843 | A | 11/1991 | Nova |
| 5,122,007 | A | 6/1992 | Smith |
| 5,197,715 | A | 3/1993 | Griffioen |
| 5,212,616 | A | 5/1993 | Dhong et al. |
| D346,734 | S | 5/1994 | Rohr |
| 5,379,174 | A | 1/1995 | Kasamoto |
| 5,595,355 | A | 1/1997 | Haines |
| 5,636,648 | A | 6/1997 | O'Brien et al. |
| 5,691,870 | A | 11/1997 | Gebara |
| 5,926,394 | A | 7/1999 | Nguyen et al. |
| 5,938,180 | A | 8/1999 | Walsten |
| 5,998,772 | A | 12/1999 | Kirma et al. |
| 6,100,467 | A | 8/2000 | Kroulik |
| 6,472,899 | B2 | 10/2002 | Osburn et al. |
| 6,655,104 | B2 | 12/2003 | Kadotani et al. |
| 6,883,782 | B2 | 4/2005 | Ames et al. |
| 6,886,484 | B2 | 5/2005 | Thomas |
| 7,019,217 | B2 | 3/2006 | Bryant |
| 7,041,909 | B2 | 5/2006 | Hiel et al. |
| 7,128,306 | B2 | 10/2006 | Ames et al. |
| 7,182,306 | B2 | 2/2007 | Tsutsumida et al. |
| 7,185,838 | B2 | 3/2007 | Mullebrouck et al. |
| 7,246,789 | B2 | 7/2007 | Ames et al. |
| 7,478,794 | B1 | 1/2009 | Gohlke et al. |
| 7,563,983 | B2 | 7/2009 | Bryant |
| 7,608,783 | B2 | 10/2009 | Bryant et al. |
| D604,594 | S | 11/2009 | Lin |
| D605,499 | S | 12/2009 | Gaudron |
| D630,501 | S | 1/2011 | Daniel et al. |
| D632,165 | S | 2/2011 | Daniel et al. |
| D635,450 | S | 4/2011 | Deese |
| 7,934,697 | B2 | 5/2011 | Gohlke et al. |
| 7,952,020 | B2 | 5/2011 | Yamamoto et al. |
| 8,022,301 | B2 | 9/2011 | Bryant et al. |
| 8,590,862 | B2 | 11/2013 | Schauerte |
| 2004/0041136 | A1 | 3/2004 | Ames et al. |
| 2009/0070966 | A1 | 3/2009 | Gohlke et al. |
| 2009/0211780 | A1 | 8/2009 | Auphand et al. |
| 2010/0176357 | A1 | 7/2010 | Wen |
| 2010/0236045 | A1 | 9/2010 | Galindo et al. |
| 2011/0101290 | A1 | 5/2011 | Carlson |
| 2011/0133141 | A1 | 6/2011 | Carlson |
| 2013/0218325 | A1 | 8/2013 | Carlson et al. |

FOREIGN PATENT DOCUMENTS

| | | |
|---|---|---|
| JP | 2002135968 | 5/2002 |
| WO | WO 2004/062072 | 7/2004 |
| WO | WO-2006/011696 A1 | 2/2006 |

OTHER PUBLICATIONS

Canadian Office Action dated Feb. 25, 2010 in Canadian Patent Application No. CA133807.
Mexican Office Action dated Dec. 6, 2010 in Mexican Patent Application No. MX/f.2010/00205.
U.S. Notice of Allowance dated May 3, 2010 in Design U.S. Appk. No. 29/340,663.
U.S. Notice of Allowance dated Nov. 24, 2010 in Design U.S. Appl. No. 29/340,663
U.S. Office Action dated Apr. 27, 2010 in Design U.S. Appl. No. 29/340,662.
U.S. Notice of Allowance dated Jun. 23, 2010 in Design U.S. Appl. No. 29/340,662.
U.S. Notice of Allowance dated Aug. 31, 2010 in Design U.S. Appl. No. 29/340,662.
10 U.S. Notice of Allowance dated Sep. 22, 2010 in Design U.S. Appl. No. 29/368,014.
User Guide, "Reusable Power Eye" by Condux International, Inc., Literature Part No. 08917089, Revision No. 2.5, Copyright 2008; 2 pages. Accessed from http://www.condux.com.
Installation Guide, "Crimp-On Pulling Eyes" by Condux International, Inc., Literature Part No. 08920097, Revision No. 2.00, Copyright 1998, 16 pages. Accessed from http://www.condux.com.
DCD Design Catalog, Cable Pulling Eyes Section, "Power Cable Pulling Eyes 00925 / 24000 / 24100 Series," p. 24. Accessed from www.dcddesign.com Jul. 2007 Catalog.; 1 page.
DCD Design Catalog, Cable Pulling Eyes Section, "24000 Power-GripÔ (lug) 24100 Power-GripÔ (clevis)," p. 25, Accessed from www.dcddesign.com Jul. 2007 Catalog; 1 page.
DCD Design Catalog, Cable Pulling Eyes Section, "Multiplex Pushing Eye 24200 Series," p. 26. Accessed from www.dcddesign.com Jul. 2007 Catalog; 1 page.
DCD Design Catalog, Cable Pulling Eyes Section, "Mimi Grip 24500 Series / Pulling Harness 25000 Series," p. 27. Accessed from www.dcddesign.com Jul. 2007 Catalog; 1 page.
"Grips Double Lock System," new product information page, accessed Mar. 18, 2010 from http://www.maxis-tools.com/, 1 page.
"Grips Maxis," product information page, accessed Mar. 18, 2010 from http://www.maxis-tools.com/product/grips/, 1 page.
"Utility Industries, Inc (UII)," product information page, accessed Mar. 18, 2010 from http://utilityindustries.com/products.html, 1 page.
"Greenlee,"product information page, accessed Mar. 18, 2010 from http://www.mygreenlee.com/Products/main.shtml?greenlee_category_id=10&product_category=109&adodb_next_page=1&portalProcess_2=showGreenleeProductTemplate&upc_number=31855, 1 page.
"Spaced and Overlapping Crimps" and "Crimp Configurations", product information page, Copyright 2007 FCI USA, Inc., 1 page.
Photograph taken Mar. 28, 2011 of Pulling-Eye from Utility Industries, Inc. crimped to conductor (believed to be used in similar fashion and/or re-sold by Applicant as early as August of 2007).
Pulling Eye—Single Conductor Assembly Instructions; Downloaded from http://utilityindustries.com on Apr. 28, 2011.
U.S. Appl. No. 12/726,992 Office Action dated Nov. 7, 2012.
U.S. Appl. No. 12/726,992 Office Action dated Apr. 11, 2013.
U.S. Appl. No. 12/726,992 Notice of Allowance dated Apr. 11, 2014.
U.S. Appl. No. 13/007,827 Office Action dated Jul. 17, 2013.
U.S. Appl. No. 13/007,827 Notice of Allowance dated Nov. 27, 2013.
Design U.S. Appl. No. 29/384,954 Notice of Allowance dated Aug. 29, 2012.
RectorSeal "Wire Snagger" product information page, accessed May 31, 2011 from http://www.rectorseal.com/index.php?site_id=1&product_id=278.
Greenlee, product catalog, accessed May 31, 2011 from http://www.greenlee.com/cat_docs/Cable_Pulling09.pdf; pp. 177-182.
"Recommended Practice for Installing Aluminum Building Wire and Cable" NECA/AA 104-2000; published by National Electrical Contractors Association, 2000.
Office Action mailed Mar. 9, 2015 in U.S. Appl. No. 14/456,594.

* cited by examiner

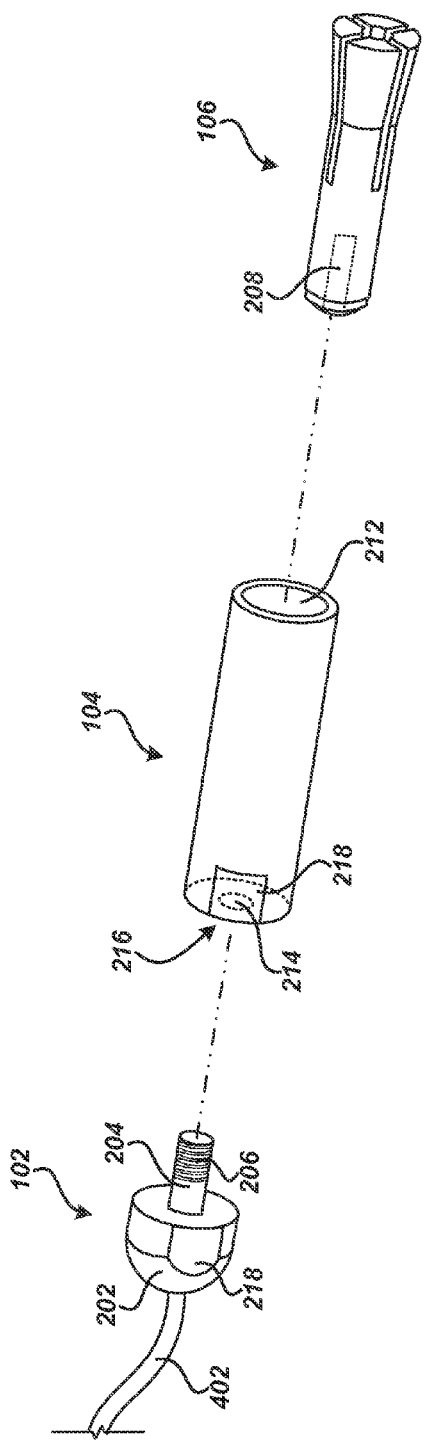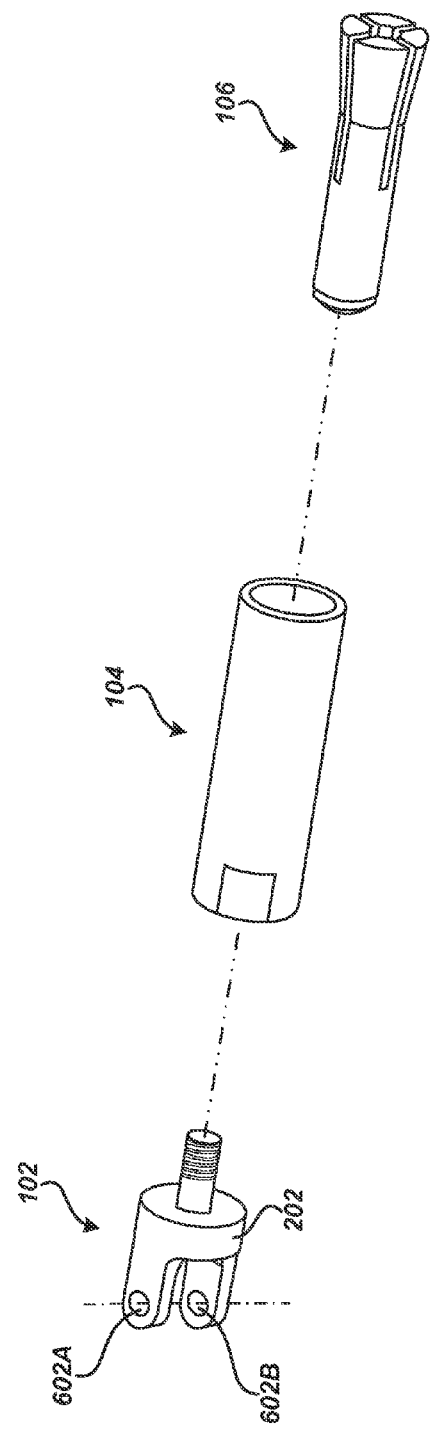

US 9,027,908 B1

FIELD-INSTALLABLE PULLING EYE

CROSS-REFERENCE TO RELATED APPLICATION

This application is related to U.S. patent application Ser. No. 12/726,992, now U.S. Pat. No. 8,800,967, filed on Mar. 18, 2010, and entitled "Integrated Systems Facilitating Wire and Cable Installations," which is expressly incorporated herein by this reference in its entirety.

BACKGROUND

Multiple conductor cabling consisting of multiple, independent wires or conductors are an integral part of many systems, including electrical and power systems. Such cabling may be installed by pulling the independent conductors in parallel through pipe or conduit over long distances. A pulling rope running through the conduit is attached to each conductor, and the rope is pulled through the conduit, drawing the multiple conductor cabling from spools or other delivery mechanism and through the conduit. The amount of force required to pull several conductors through a lengthy conduit, potentially with many bends or turns, may be substantial, and if the force is applied to the cabling improperly, one or more conductors may be damaged during the pull. Such damage may hamper performance of the multiple conductor cabling or present safety issues. In addition, finding and repairing the damaged portions of the conductors may be prohibitively expensive or physically impossible, and may necessitate replacement of the entire cabling.

The conductors may be attached to the pulling rope through a pulling head. The pulling head may include a pulling eye attached to each conductor, and individual pulling cables that attach each pulling eye to the pulling rope. Often pulling heads are assembled for a given pull on an ad hoc basis at the jobsite. Several types of pulling eyes may be available for assembly of the pulling head in the field. Basket style or "gripper" pulling eyes impart pulling force to the conductor through the insulation, and may not be able to apply enough force to complete the pull. Set-screw style pulling eyes only secure a subset of the individual strands or wire that make up the core of the conductor core, resulting in potential damage to the conductor during the pull. Crimp-on pulling eyes may be crimped to the core of the conductor and provide sufficient pulling force to complete the pull without damaging the conductor, but also require special tools to install, such as a power-crimper and die sets for each size of conductor and/or pulling eye involved in the pull.

It is with respect to these considerations and others that the disclosure made herein is presented

SUMMARY

It should be appreciated that this Summary is provided to introduce a selection of concepts in a simplified form that are further described below in the Detailed Description. This Summary is not intended for use in limiting the scope of the claimed subject matter.

A field-installable pulling eye and associated methods for providing and installing the pulling eye on a conductor are described herein. According to one embodiment, the pulling eye comprises a bolt, a sleeve, and a collet. The sleeve has a hollow interior defining a cavity configured to receive the collet through an open end, and an aperture passing from the exterior of the sleeve to the cavity at the opposite end. The bolt has a head portion and a threaded shaft configured to pass through the aperture and engage a complementary threaded orifice at one end of the collet. The collet has two or more jaws extending from the opposite end that are configured to exert a compression force on the terminal end of a conductor inserted between the jaws as the collet is drawn into the cavity of the sleeve by tightening the bolt.

According to another embodiment, a method for affixing the field-installable pulling eye onto the conductor comprises inserting the terminal end of the conductor between a number of jaws extending from an end of a collet. The collet is inserted into the cavity at an opened end of a sleeve, while the threaded shaft of a bolt is inserted through an aperture at the other end of the sleeve to engage a complementary threaded orifice of the collet. The bolt is tightened causing the bolt to be drawn into the cavity of the sleeve such that the jaws flex inward and exert a compression force upon the terminal end of the conductor.

Other apparatus, systems, and methods according to embodiments will be or become apparent to one with skill in the art upon review of the following drawings and Detailed Description. It is intended that all such additional apparatus, systems, and/or methods be included within this description, be within the scope of the present invention, and be protected by the accompanying claims.

BRIEF DESCRIPTION OF THE DRAWINGS

FIGS. 5 and 6 are exploded views showing details of alternative/additional embodiments of the field-installable pulling eye, as presented herein;

DETAILED DESCRIPTION

Figure 1:
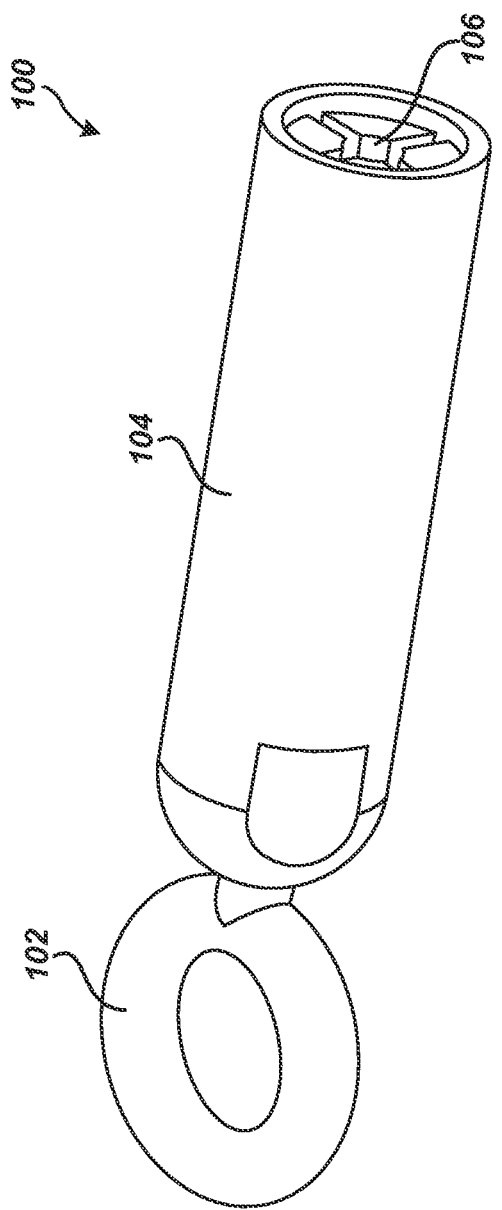
FIG. 1 is a perspective view showing an exemplary field-installable pulling eye, according to various embodiments presented herein.

The following detailed description is directed to a field-installable pulling eye and a method for using the same. As discussed briefly above, pulling heads for pulling a single conductor or multi-conductor cabling through conduits may be assembled for a given cable pull at the jobsite. Traditional pulling eyes available for such an ad hoc assembly may not provide sufficient pulling force on the conductor(s) to complete the cable pull, may damage the conductor(s) during the pull, and/or may require special tools to install. Using the field-installable pulling eyes described herein, a pulling head may be easily and quickly assembled at the jobsite that provides a reliable connection to the conductors without requiring special tools and equipment. This may reduce setup time, pulling time, and cleanup time, as well as reduce the risk of damage to the conductors during installation. In addition, the field-installable pulling eyes may be reused on subsequent cable pulls, further reducing cost of an overall installation.

In the following detailed description, references are made to the accompanying drawings that form a part hereof, and that show by way of illustration specific embodiments or examples. The drawings are not drawn to scale. Accordingly, the dimensions or proportions of particular elements, or the relationships between those different elements, as shown in the drawings are chosen only for convenience of description, but do not limit possible implementations of this disclosure. Like numerals represent like elements throughout the several figures.

FIG. 1 shows an exemplary field-installable pulling eye 100, according to one embodiment. The pulling eye 100 comprises a bolt 102, a sleeve 104, and a collet 106. According to embodiments, the bolt 102 serves two purposes: 1) it provides a connection point for a pulling cable, rope, or other pulling member in the pulling head assembly, and 2) it draws the collet 106 into the sleeve 104 while affixing the pulling eye 100 to a conductor or cable, as will be described in more detail herein. The sleeve 104 acts as the body providing compression for the collet 106 as the collet is drawn into the sleeve by the bolt 102. The collet 106 is an expandable/compressible component that is compressed onto the terminal end of the conductor while affixing the pulling eye 100 to the conductor.

Figure 2:
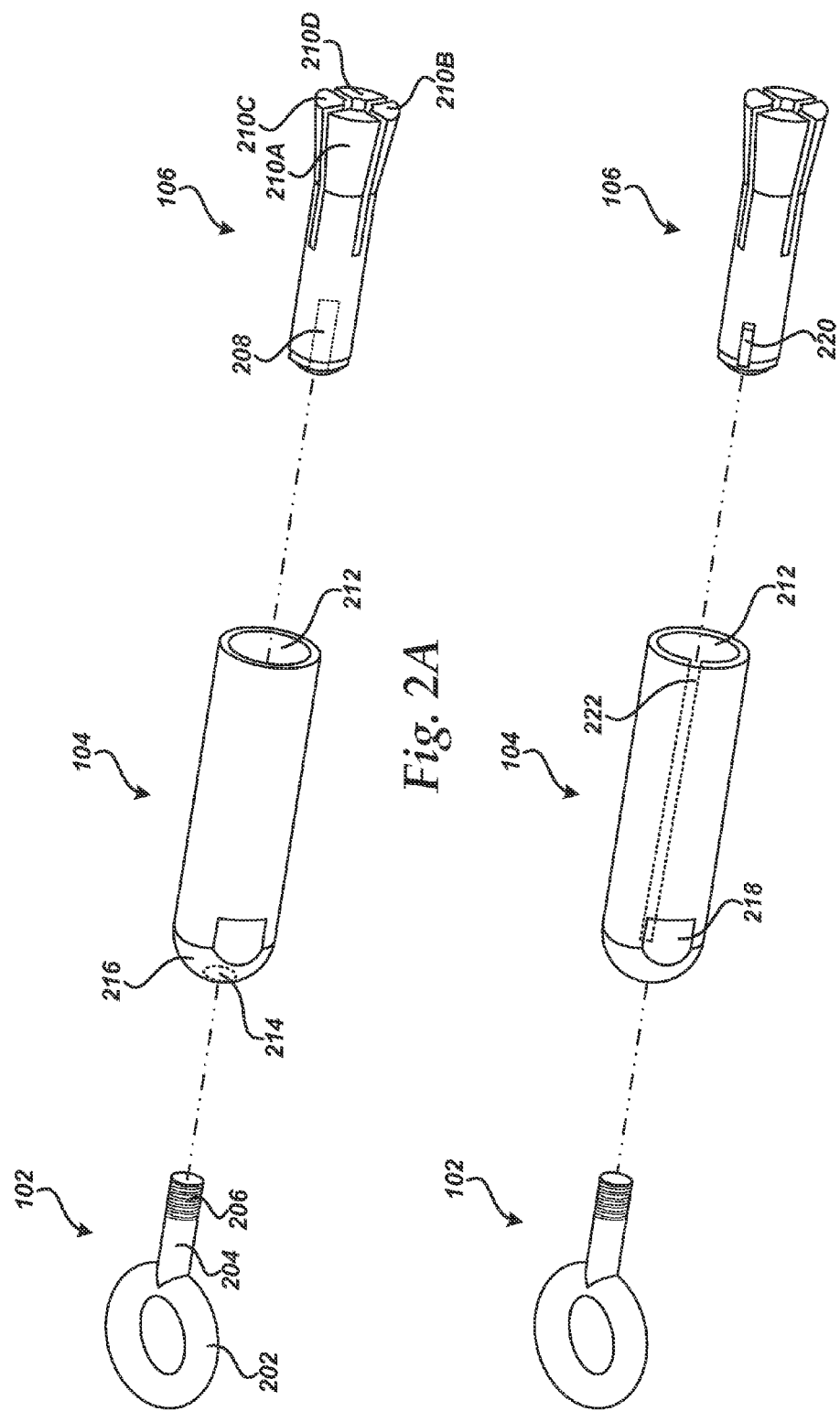
FIGS. 2A and 2B are exploded views showing further details of the field-installable pulling eye, according to various embodiments presented herein.

FIG. 2A provides additional details of the bolt 102, the sleeve 104, and the collet 106 as well as their assembly. According to one embodiment, the bolt 102 (also referred to herein as engagement member) includes a head portion 202, which may be formed as a ring, an eye, or some other mechanism for connecting the pulling eye 100 to a pulling cable or pulling rope when preparing for the cable pull. The bolt 102 further includes a shaft 204 with a threaded tip 206 extending from the head portion 202. The collet 106 includes a complimentary threaded orifice 208 in one end and a number of expandable/compressible jaws 210A-210D (referred to herein generally as jaws 210) extending from the other end. For example, the collet 106 may include four individual jaws 210A-210D, as shown in the figure. It will be appreciated that the collet 106 may also have two, three, five, six, or more jaws 210, according to alternative embodiments. In one embodiment, the collet 106 may have a round cross-section. In other embodiments, the collet 106 may be polygonal.

The sleeve 104 includes a hollow interior defining a complimentary cylindrical or polygonal cavity 212 opened at one end for receiving the collet 106, with the opposite end closed. The closed end 216 of the sleeve 104 may be rounded and the outer surface of the sleeve may be smooth to facilitate pulling of the assembled pulling eye 100 and affixed conductor through a conduit or other channel during the cable pull. The sleeve 104 further includes an aperture 214 through the closed end 216. To assemble the pulling eye 100, the shaft 204 of the bolt 102 may be inserted through the aperture 214 in the closed end 216 of the sleeve 104 while the collet 106 is inserted into the cavity 212 at the other end of the sleeve such that the threaded tip 206 of the shaft engages the complementary threaded orifice 208 on the end of the collet. Tightening of the bolt 102 then serves to draw the collet 106 into the cavity 212 of the sleeve 104, causing the jaws 210 extending from the other end of the collet to flex inward and tighten around the conductor, as will be described in more detail below in regard to FIG. 3.

In order to tighten the bolt 102 to draw the collet 106 into the sleeve 104, the sleeve may further include one or more flats 218, as shown in FIG. 2B. The flats 218 may be engaged by a wrench, pliers, or other conventional tool to prevent the sleeve 104 from rotating while the bolt 102 is tightened. In one embodiment, the collet 106 further includes a key 220 that engages a complimentary slot 222 on the interior surface of the cavity 212 of the sleeve 104 to prevent the collet from spinning inside the cavity 212 when the bolt 102 is tightened. Alternatively, the key 220 may be located on the interior surface of the cavity 212 of the sleeve 104 such that it engages a complimentary slot 222 in the body of the collet 106. In another embodiment, the sleeve 104 may include a set-screw (not shown) that holds the collet 106 in place within the cavity 212.

Figure 3:
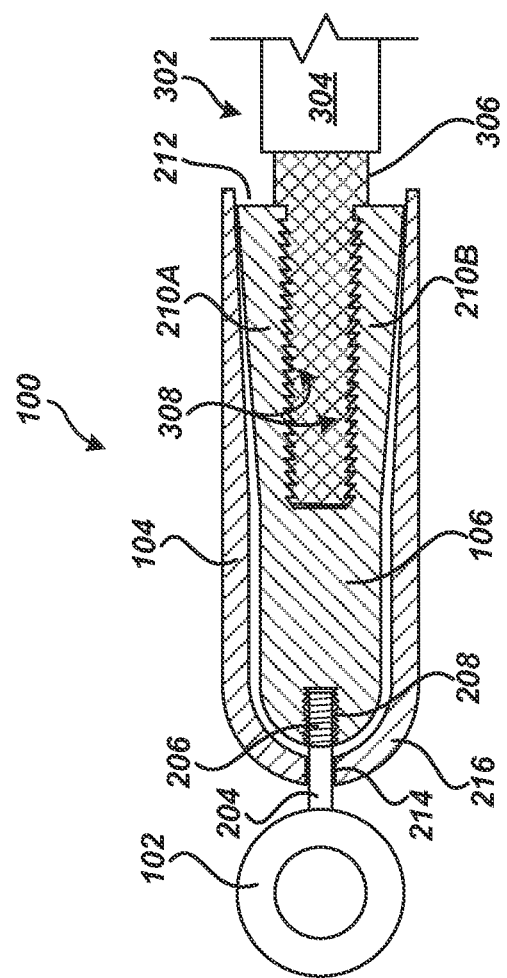
FIG. 3 is a sectional view showing further details of the field-installable pulling eye as affixed to a conductor, according to various embodiments presented herein.

FIG. 3 shows further details of the field-installable pulling eye 100 affixed to the terminal end of a conductor 302. According to one embodiment, a portion of the insulation 304 of the conductor 302 may be stripped away from the terminal end to expose the underlying bare cable or wire 306. The exposed wire 306 of the terminal end of the conductor 302 is then inserted between the jaws 210 of the collet 106, before the collet is inserted into the sleeve. As described above, the shaft 204 of the bolt 102 is then inserted through the aperture 214 in the closed end 216 of the sleeve 104 so that the threaded tip 206 engages the complementary threaded orifice 208 in the end of the collet 106. The bolt 102 is then tightened, drawing the collet 106 into the sleeve 104.

As the collet 106 is drawn into the sleeve 104 by the tightening of the bolt 102, the jaws 210 extending from the collet are pushed inward and tighten around the conductor 302, imparting a compression or gripping force onto the exposed wire 306 and/or insulation 304 such as to affix the pulling eye 100 to the terminal end of the conductor. According to a further embodiment, the jaws 210 may include teeth 308 or other engagement means on the inside surfaces such as to impart additional lateral pulling force on the exposed wire 306 of the conductor 302 during the cable pull, while the outside of the jaws are smooth to facilitate easy insertion of the collet 106 into the sleeve 104 of the pulling eye 100.

According to a further embodiment, the wall thickness of the sleeve 104 increases as it runs inward from the opened end of the cavity 212 towards the closed end 216. This results in an inward taper of the inside surface of the cavity. The tapered cavity 212 may allow the compression force of the jaws 210 onto the exposed wire 306 to be increased as the collet 106 is drawn further into the sleeve 104. The tapered cavity 212 may be tapered between 5 and 20 degrees, with a preferable taper of approximately 15 degrees or less between the inside surface of the sleeve 104 and the outside surface. Additionally or alternatively, the exterior surface of the jaws 210 may be similarly tapered outward in order to apply additional compression force onto the conductor 302 as the collet 106 is drawn further into the sleeve 104.

The bolt 102, sleeve 104, and collet 106 of the pulling eye 100 may be made from any suitable material, such as aluminum or an alloy thereof, and may be manufactured using any suitable processes, including, but not limited to, machining from a single piece of stock aluminum or other material, as well as forging, casting, molding, or the like. The components of the pulling eye 100 may be designed to be affixed to a conductor 302 of a particular size and/or type. For example, one pulling eye assembly may be sized to be affixed to stranded conductors 302 in the range of 400-500 kcmil, while another pulling eye assembly may be sized to be affixed to solid conductors of 250 kcmil in size. In one embodiment, the size of the bolt 102 and/or sleeve 104 of the pulling eye 100 may be common across a range of conductor sizes, while the size of the collet 106 is varied to accommodate different sizes and types of conductors 302.

Figure 4:
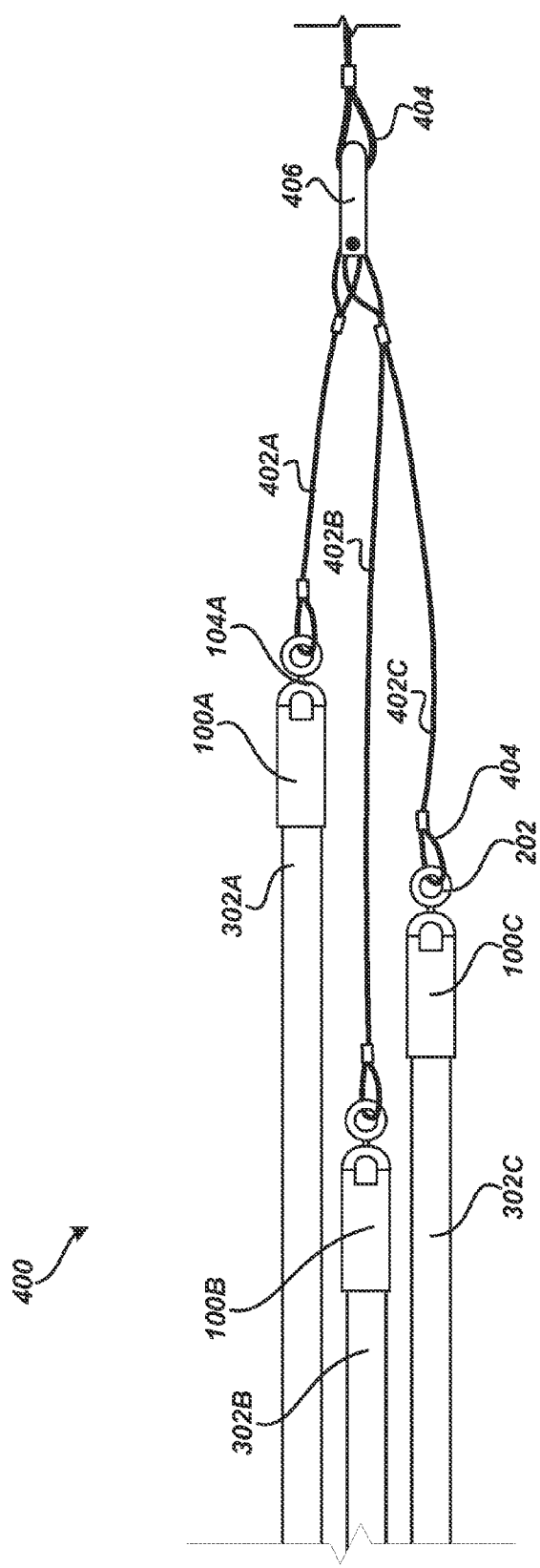
FIG. 4 is a diagram of a pulling head assembly attached to multiple conductors using the field-installable pulling eye, according to various embodiments presented herein.

FIG. 4 illustrates an example pulling head assembly 400 assembled for a cable pull using the field-installable pulling eyes 100 as described herein. The pulling eyes 100A, 100B, and 100C are affixed to the terminal ends of conductors 302A, 302B, and 302C, respectively. It will be appreciated that any number of conductors 302 may be present in a multi-conductor cabling pull, and the conductors may be of various diameters and constructed of various materials, depending on the requirements and function of the cabling system being installed. The pulling eyes 100 are further connected respectively to pulling cables 402A, 402B, and 402C (referred to herein generally as pulling cables 402). The pulling cables 402 may be constructed of metallic or non-metallic materials and may be coated or impregnated with a low-friction compound to reduce friction within a conduit or channel during the cable pull.

The pulling eyes 100 may be connected to the pulling cables 402 using a snap-hook, carabiner, or clevis that may pass through the ring or other connection means at the head portion 202 of the bolt 102 on the pulling eye 100. In another example, the snap-hook, carabiner, or clevis may be omitted in favor of passing an end of the pulling cable 402 through the ring of the pulling eye 100 and fastening the end of the pulling cable back on itself, as shown at 404 in FIG. 4. The opposite ends of the pulling cables 402 may be terminated with a loop, ring, or other means suitable for linking the pulling cables to a pulling rope 404 by a common swivel-hook, carabiner, or clevis 406 for pulling the conductors through a conduit or other channel during the cable pull. In another example, the pulling rope 404 may be connected directly to the pulling eye 100 of a single conductor 302 for a single-conductor pull.

It will be appreciated that the pulling eye 100 and components are designed to maintain their grip on the conductor 302 at a pulling force beyond the published maximum allowable pulling force for a given electrical cable size. Therefore, the gripping strength of the assembled pulling eye 100 will be sufficient to withstand the tension that the conductor 302 is expected to encounter during the cable pull. According to a further embodiment, once the pull is complete, the bolt 102 may be removed from the end of the collet 106, allowing the collet to be removed from the sleeve 104. This, in turn, releases the compression force on the terminal end of the conductor 302 such that the collet 106 may be removed from the conductor. One or more of the bolt 102, the sleeve 104, and the collet 106 may then be used again to assemble the pulling eye 100 onto another conductor 302 in another cable pull.

FIG. 5 shows another example of a field-installable pulling eye 100, according to additional embodiments. As shown in the figure, the bolt 102 may include a rounded head portion 202 instead of the ring shown in FIGS. 2A and 2B. The rounded head portion 202 may be pre-attached to a pulling cable 402, as described above in regard to FIG. 4. The opposite end of the pulling cable 402 may be terminated in a loop or ring for connection to a pulling rope 404, or may be connected to another bolt 102 for an end-to-end installation of the pulling eyes 100, as will be described below.

The rounded head portion 202 further includes the shaft 204 with the threaded tip 206 for passing through the aperture 214 in the closed end 216 of the sleeve 104 and engaging the complementary threaded orifice 208 on the end of the collet 106. The closed end 216 of the sleeve 104 may be flat to accommodate the bottom surface of the rounded head portion 202 of the bolt 102. The rounded head portion 202 of the bolt 102 and/or the outer surface of the sleeve 104 may further include one or more flats 218 to be engaged by a wrench, pliers, or other conventional tool in order to tighten the bolt 102 during assembly of the pulling eye 100, as will be described below in regard to FIG. 8.

Figure 7:
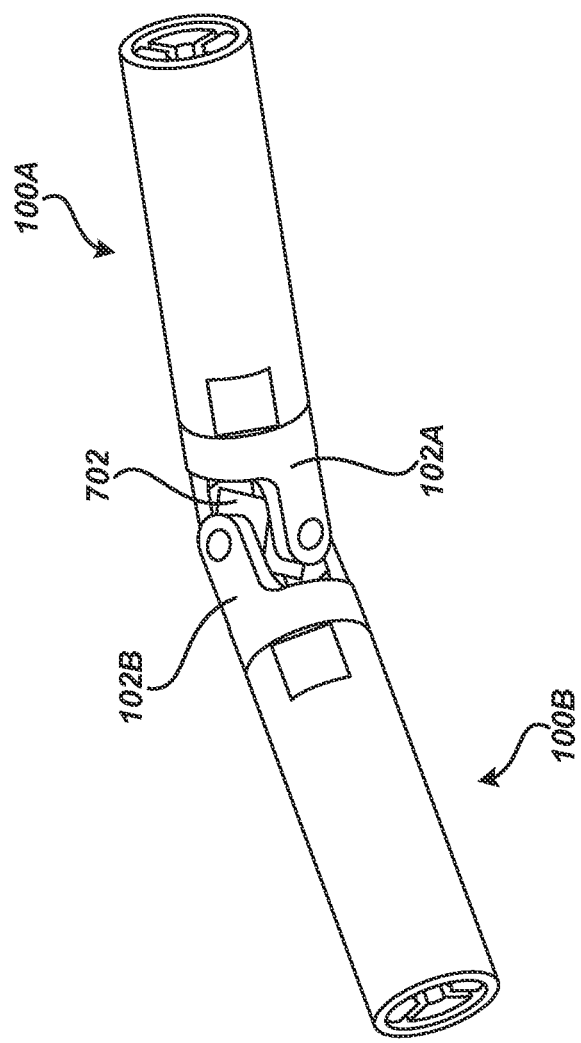
FIG. 7 is a perspective view of two field-installable pulling eyes connected end-to-end, according to various embodiments presented herein.

FIG. 6 shows a further example of a field-installable pulling eye 100, according to additional embodiments. As shown in the figure, the bolt 102 may include a u-shaped head portion 202 instead of the ring shown in FIGS. 2A and 2B. The u-shaped head portion 202 may further include opposite apertures 602A and 602B along the same axis. By passing a pin or shaft through the apertures 602A and 602B of the u-shaped head portion 202 and through a connecting ball or block 702, the bolt 102A of the pulling eye 100A may be connected to a similarly shaped bolt 102B of a second pulling eye 100B using a universal joint configuration, as shown in FIG. 7.

The universal joint configuration provides for the pulling eyes 100A and 100B to be connected end-to-end, allowing the terminal end of one conductor 302 to be pulled through the conduit or channel during the cable pull by the terminal end of another conductor, for example. The universal joint configuration may allow the pulling eyes 100A, 100B affixed to respective conductors 302 to bend and twist in a natural fashion during the cable pull, as if a single conductor were being pulled. It will be appreciated that this end-to-end configuration of the pulling eyes 100A, 100B may also be achieved by connecting the head portion 202 of the bolts 102A, 102B of the pulling eyes to a common pulling cable 402, or by connecting the rings of the bolts by a swivel-hook, carabiner, or other attachment mechanism.

Figure 8:
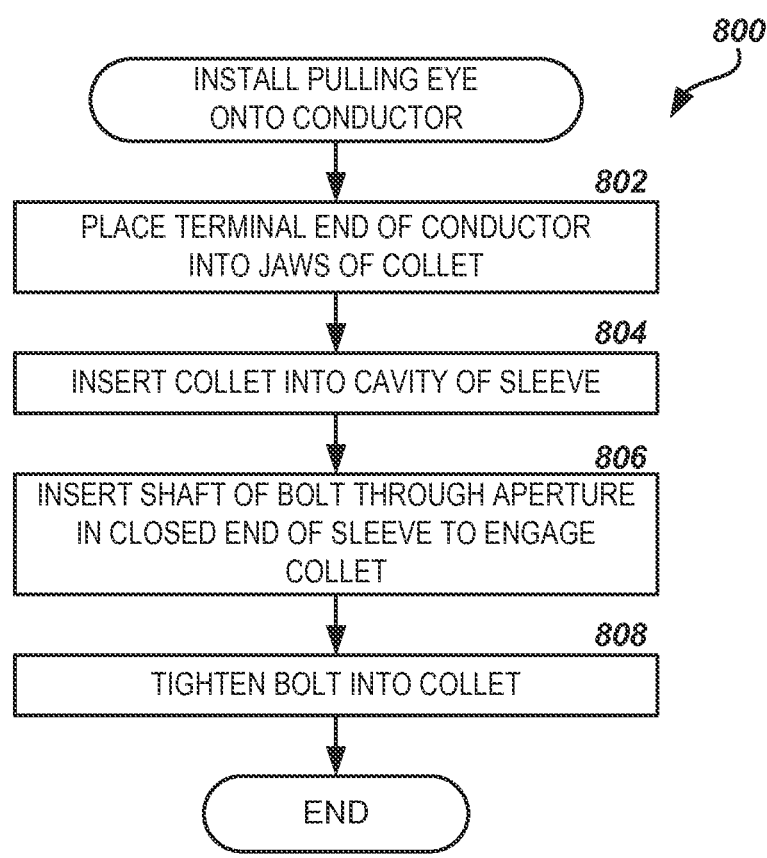
FIG. 8 is a flow diagram illustrating one method of installing the field-installable pulling eye on a conductor, as described in the embodiments presented herein.

FIG. 8 illustrates one routine 800 for installing the field-installable pulling eye 100 described herein onto a conductor 302. According to embodiments, the routine 800 may be performed by one or more installers at a jobsite while preparing for a cable pull. It will be appreciated that the operations described below may be performed by one or more installers on any number of pulling eyes 100 and conductors 302 involved in the cable pull. It will further be appreciated that more or fewer operations may be performed than are shown in the figures and described herein, and that the operations may be performed in a different order than described.

The routine 800 begins with operation 802, where the terminal end of the conductor 302 is placed into the jaws 210 of the collet 106. According to one embodiment, a portion of the insulation 304 of the conductor 302 may be stripped away from the terminal end to expose the underlying bare cable or wire 306. The exposed wire 306 of the terminal end of the conductor 302 is then inserted between the jaws 210, as shown above in regard to FIG. 3. In another embodiment, a portion of the outer layers of the exposed wired may be cut away to expose a center-core of the conductor 302, which is then placed into the jaws 210. In a further embodiment, the terminal end of the conductor 302 may be inserted into the jaws 210 of the collet 106 without removing any insulation 304.

The routine 800 proceeds from operation 802 to operation 804, where the collet 106 is inserted into the cavity 212 of the sleeve 104, as shown above in regard to FIGS. 2A and 2B. The collet 106 may be inserted into the cavity 212 until a widest portion of the jaws 210 engage the interior taper of the sleeve 104, for example. Next, at operation 806, the shaft 204 of the bolt 102 is inserted through the aperture 214 in the closed end 216 of the sleeve 104 such that the threaded tip 206 of the shaft engages the complementary threaded orifice 208 on the end of the collet, as further described above.

From operation 806, the routine 800 proceeds to operation 808, where the bolt 102 is tightened in order to draw the collet 106 into the cavity 212 of the sleeve 104, causing the jaws 210 of the collet to compress inward and tighten around the conductor 302. The bolt 102 may be tightened until the collet 106 has been drawn fully within the cavity 212 of the sleeve 104, or until a stop is reached, for example. Alternatively, the bolt 102 may be tightened to a predefined torque based on the characteristics of the conductor 302 to which the pulling eye 100 is being affixed.

Figure 9:
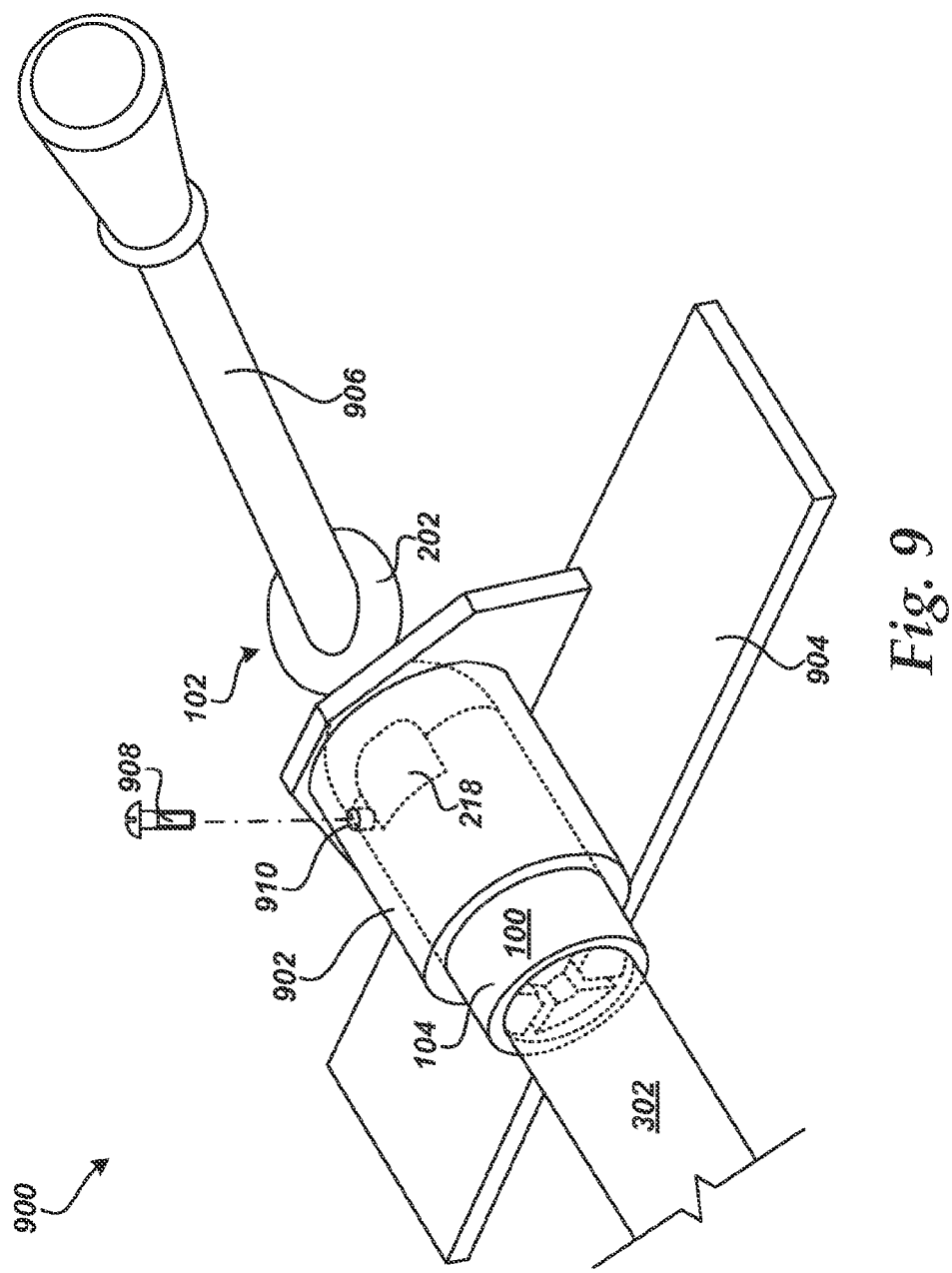
FIG. 9 is a perspective view of a tool for installing the field-installable pulling eyes, according to various embodiments presented herein.

According to one embodiment, a portable tool 900 may be utilized to tighten the bolt 102 during installation of the field-installable pulling eye 100 onto the conductor 302, as shown in FIG. 9. The portable tool 900 may include a housing 902 in which the pulling eye 100 assembled onto the terminal end of the conductor 302 is placed. The housing 902 may be attached to a base 904, which allows the portable tool 900 to be held firmly in place during the tightening operation 808. For example, the base 904 may be clamped to a work table, or held in position by the feet or knees of an installer tightening the bolt 102. The portable tool 900 may also include a handle 906 which is used to rotate the bolt 102. For example, the handle 906 may be passed through the ringed head portion 202 on the end of the bolt 102 in order to tighten the bolt, as described above.

According to another embodiment, the portable tool 900 further includes a pin or screw 908 which is inserted into an aperture 910 in the housing 902 in order to engage a flat 218 on the sleeve 104 of the pulling eye 100. The pin or screw 908 may serve to prevent the pulling eye assembly from rotating during the tightening operation 808. Alternatively or additionally, the interior of the housing 902 may be shaped as to engage the flats 218 or other contours of the outer surface of the sleeve 104 in order to prevent the pulling eye assembly from rotating during the tightening operation 808. From operation 808, the routine 800 ends.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A pulling eye comprising:
    a sleeve having a hollow interior defining a cavity configured to receive a collet, wherein the sleeve is open at one end and comprises an aperture passing from an exterior of the sleeve to the cavity at an opposite end;
    an engagement member having a head portion and a threaded shaft configured to pass through the aperture and engage a complementary threaded orifice of the collet; and
    the collet comprising the complementary threaded orifice at one end and a plurality of jaws extending from an opposite end, the plurality of jaws configured to flex inward with respect to a longitudinal axis of the collet to exert a compression force upon a terminal end of a conductor when the terminal end of the conductor is inserted between the plurality of jaws and as the collet is drawn into the cavity of the sleeve by tightening the engagement member.

2. The pulling eye of claim 1, wherein the collet further comprises a key configured to engage a complimentary slot in an interior surface of the cavity when the collet is inserted into the cavity.

3. The pulling eye of claim 1, wherein an interior surface of the cavity is tapered inward such that the compression force of the plurality of jaws exerted upon the terminal end of the conductor increases as the collet is drawn into the cavity.

4. A method for affixing a pulling eye onto a conductor, the method comprising:
    inserting a terminal end of the conductor between a plurality of jaws extending from an end of a collet;
    inserting the collet into a cavity defined by a hollow interior of a sleeve;
    inserting a threaded shaft of a bolt through an aperture in a closed end of the sleeve to engage a complementary threaded orifice of the collet; and
    tightening the bolt such as to draw the collet into the cavity of the sleeve causing the plurality of jaws to exert a compression force upon the terminal end of the conductor, wherein the bolt is tightened using a portable tool comprising:
        a base configured to secure the portable tool during the tightening,
        a housing affixed to the base and configured to receive the pulling eye and to prevent the pulling eye from rotating during the tightening, and
        a handle configured to engage and rotate the bolt to perform the tightening.

5. The method of claim 4, further comprising removing a portion of an insulation of the conductor from the terminal end before inserting the terminal end between the plurality of jaws.

6. The method of claim 4, further comprising tightening the bolt such that the compression force exerted by the plurality of jaws upon the terminal end of the conductor is sufficient to maintain a grip of the pulling eye on the conductor beyond a maximum allowable pulling force for the conductor.

7. The method of claim 4, further comprising connecting a head portion of the bolt to a pulling cable or a pulling rope for pulling the conductor through a conduit or a channel.

8. A pulling eye comprising:
    a sleeve having a hollow interior defining a cavity configured to receive a collet, wherein the sleeve is open at one end and comprises an aperture passing from an exterior of the sleeve to the cavity at an opposite end;
    an engagement member having a head portion and a threaded shaft configured to pass through the aperture and engage a complementary threaded orifice of the collet; and
    the collet comprising the complementary threaded orifice at one end and a plurality of jaws extending from an opposite end, the plurality of jaws configured to exert a compression force upon a terminal end of a conductor inserted between the plurality of jaws as the collet is drawn into the cavity of the sleeve by tightening the engagement member, wherein the collet further comprises a key configured to engage a complimentary slot in an interior surface of the cavity when the collet is inserted into the cavity.

9. The pulling eye of claim 8, wherein the engagement member comprises a bolt.

10. The pulling eye of claim 8, wherein the interior surface of the cavity is tapered inward such that the compression force of the plurality of jaws exerted upon the terminal end of the conductor increases as the collet is drawn into the cavity.

11. The pulling eye of claim 8, wherein an exterior surface of the plurality of jaws is tapered outward such that the compression force of the plurality of jaws exerted upon the terminal end of the conductor increases as the collet is drawn into the cavity.

12. The pulling eye of claim 8, wherein an interior surface of the plurality of jaws comprises teeth for exerting a lateral force on the terminal end of the conductor when pulling the conductor.

13. The pulling eye of claim 8, wherein the sleeve further comprises at least one flat allowing the sleeve to be held securely while the engagement member is tightened.

14. The pulling eye of claim 8, wherein the head portion of the engagement member comprises a ring for connecting a pulling cable or pulling rope for pulling the conductor through a conduit or channel.

15. The pulling eye of claim 8, wherein the head portion of the engagement member comprises a rounded portion pre-attached to a pulling cable.

16. The pulling eye of claim 8, wherein the head portion of the engagement member comprises a u-shaped portion configured to be connected to another head portion of another engagement member of another pulling eye through a connecting block, such that the pulling eye and the another pulling eye are connected end-to-end.

17. The pulling eye of claim 8, wherein one or more of the engagement member, the sleeve, and the collet are sized to be applied to a particular cabling size of the conductor.

18. A method for providing a pulling eye configured to be affixed onto a conductor, the method comprising:
   providing a collet having a plurality of jaws extending from an end of the collet and configured to receive a terminal end of the conductor between the plurality of jaws;
   providing a sleeve having a hollow interior defining a cavity configured to receive the collet;
   providing an engagement member having a threaded shaft configured to be inserted through an aperture in a closed end of the sleeve to engage a complementary threaded orifice of the collet, wherein the engagement member is operable to draw the collet into the cavity of the sleeve causing the plurality of jaws to flex inward with respect to a longitudinal axis of the collet to exert a compression force upon the terminal end of the conductor.

19. The method of claim 18, wherein the compression force exerted by the plurality of jaws upon the terminal end of the conductor is sufficient to maintain a grip of the pulling eye on the conductor beyond a maximum allowable pulling force for the conductor.

20. The method of claim 18, wherein the engagement member further comprises a head portion configured to be connected to a pulling cable or a pulling rope for pulling the conductor through a conduit or channel.

21. The method of claim 18, further comprising providing a portable tool configured to allow tightening of the engagement member to draw the collet into the sleeve, the portable tool comprising:
   a base configured to secure the portable tool during the tightening;
   a housing affixed to the base and configured to receive the pulling eye and to prevent the pulling eye from rotating during the tightening; and
   a handle configured to engage and rotate the engagement member to perform the tightening.

\* \* \* \* \*